US008917346B2

(12) United States Patent
Geisler et al.

(10) Patent No.: US 8,917,346 B2
(45) Date of Patent: Dec. 23, 2014

(54) FOCUS ERROR ESTIMATION IN IMAGES

(71) Applicant: Board of Regents, The University of Texas System, Austin, TX (US)

(72) Inventors: Wilson Geisler, Austin, TX (US); Johannes Burge, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/965,758

(22) Filed: Aug. 13, 2013

(65) Prior Publication Data

US 2013/0329122 A1     Dec. 12, 2013

Related U.S. Application Data

(63) Continuation of application No. PCT/US2012/026817, filed on Feb. 27, 2012.

(60) Provisional application No. 61/446,566, filed on Feb. 25, 2011.

(51) Int. Cl.
| | |
|---|---|
| G03B 13/00 | (2006.01) |
| G06K 9/62 | (2006.01) |
| G06K 9/40 | (2006.01) |
| G06K 9/36 | (2006.01) |
| H04N 5/235 | (2006.01) |
| G02B 7/36 | (2006.01) |
| H04N 5/232 | (2006.01) |

(52) U.S. Cl.
CPC ............... *H04N 5/235* (2013.01); *G02B 7/36* (2013.01); *H04N 5/23212* (2013.01)
USPC ........... 348/349; 348/345; 348/354; 382/155; 382/159; 382/160; 382/255; 382/280

(58) Field of Classification Search
None
See application file for complete search history.

(56) References Cited

U.S. PATENT DOCUMENTS

| | | |
|---|---|---|
| 6,677,565 B1 | 1/2004 | Wahl et al. |
| 2010/0053417 A1 | 3/2010 | Baxansky |

(Continued)

OTHER PUBLICATIONS

International Preliminary Report on Patentability dated Aug. 27, 2013 for International Application No. PCT/US2012/026817, 6 pages.

(Continued)

*Primary Examiner* — Roberto Velez
*Assistant Examiner* — Quan Pham
(74) *Attorney, Agent, or Firm* — Kilpatrick Townsend & Stockton LLP

(57) ABSTRACT

Estimating focus error in an image involves a training phase and an application phase. In the training phase, an optical system is represented by a point-spread function. An image sensor array is represented by one or more wavelength sensitivity functions, one or more noise functions, and one or more spatial sampling functions. The point-spread function is applied to image patches for each of multiple defocus levels within a specified range to produce training data. Each of the images for each defocus level (i.e. focus error) is sampled using the wavelength sensitivity and spatial sampling functions. Noise is added using the noise functions. The responses from the sensor array to the training data are used to generate defocus filters for estimating focus error within the specified range. The defocus filters are then applied to the image patches of the training data and joint probability distributions of filter responses to each defocus level are characterized. In the application phase, the filter responses to arbitrary image patches are obtained and combined to derive continuous, signed estimates of the focus error of each arbitrary image patch.

55 Claims, 10 Drawing Sheets

(56) References Cited

U.S. PATENT DOCUMENTS

| | | | |
|---|---|---|---|
| 2010/0202667 A1* | 8/2010 | Ren et al. | 382/117 |
| 2011/0019909 A1* | 1/2011 | Farid et al. | 382/160 |
| 2011/0019932 A1 | 1/2011 | Hong | |
| 2011/0032575 A1 | 2/2011 | Xu et al. | |
| 2011/0199532 A1* | 8/2011 | Jin | 348/345 |
| 2013/0129233 A1* | 5/2013 | Schiller et al. | 382/228 |

OTHER PUBLICATIONS

International Search Report and Written Opinion dated Dec. 28, 2012 for International Application No. PCT/US2012/026817, 9 pages.

* cited by examiner

FOCUS ERROR ESTIMATION IN IMAGES

CROSS-REFERENCES TO RELATED APPLICATIONS

This application is a continuation application of PCT Application No. PCT/US2012/026817 filed on Feb. 27, 2012, title "Focus Error Estimation in Images", which is a nonprovisional patent application of U.S. Provisional Application Ser. No. 61/446,566 filed on Feb. 25, 2011, titled "Defocus Estimation in Individual Natural Images", which are hereby expressly incorporated by reference in their entirety for all purposes.

STATEMENT AS TO RIGHTS TO INVENTIONS MADE UNDER FEDERALLY SPONSORED RESEARCH OR DEVELOPMENT

The U.S. Government may own certain rights in this invention pursuant to the terms of the National Institutes of Health Grant No. 2 R01EY11747.

BACKGROUND

The present invention relates to autofocus optical systems, and more particularly to estimation of error in images received through an optical system.

An autofocus optical system (e.g., digital camera, digital video camera, microscope, micro-fabrication device) uses a sensor, a control system and a motor to focus fully automatically or on a manually selected point or area. There are two primary classes of focusing methods that are used by autofocus optical systems to determine the correct focus. One class is referred to as "active" autofocusing. This class of autofocusing determines the focus by emitting a signal (e.g., infrared light, ultrasonic sound wave). In the case of emitting sound waves, the distance to the subject is calculated by measuring the delay in their reflection. In the case of emitting infrared light, the target distance is computed by triangulating the distance to the subject. While active autofocusing methods function in very low light conditions they are unable to focus on very near objects (e.g., macro-photography) and cannot focus through windows because glass reflects the emitted signals.

The other class of autofocusing is referred to as "passive" or "image-based" autofocusing. The focus is determined by analyzing the image entering the optical system. Hence, passive autofocusing methods generally do not direct any energy, such as ultrasonic sound or infrared light waves, toward the subject. The two primary methods of passive autofocusing are contrast measurement and phase detection.

Contrast measurement is achieved by measuring the intensity differences of pixels on the image sensor within a small area. The intensity difference between adjacent pixels of the sensor generally increases with decreasing focus error. The optical system can thereby be adjusted until the maximum contrast is detected. However, this method of focusing is slow because it searches rather than obtains an estimate of the necessary changes in focus. Additionally, the method depends on the assumption that the contrast tracks perfectly with focus error. This assumption is not strictly correct. Furthermore, contrast measurement does not provide an estimate of defocus sign. That is, it does not calculate whether the optical system is focused in front or behind the subject.

Phase detection autofocusing is achieved by dividing the incoming light into pairs of images and comparing them. The system couples a beam splitter, a small secondary mirror, and two optical prisms to direct the light to a dedicated autofocusing sensor in the optical system. Two optical prisms capture the light rays coming from the opposite sides of the lens and divert them to the autofocusing sensor, creating a simple rangefinder with a base similar to the aperture diameter. The two images are then analyzed for similar light intensity patterns (peaks and valleys) and the phase difference is calculated in order to determine the magnitude of the focus error and to determine whether the optical system is focused in front of or behind the subject. While the phase detection method is fast and accurate and estimates defocus sign, it is very costly to implement because it requires special beam splitters, mirrors, prisms, and sensors. Furthermore, the extra hardware increases the size and weight of the optical system. Additionally, such a method cannot operate in "live-view" mode (a feature that allows an optical system's display screen, such as a digital camera's display screen, to be used as a viewfinder).

If, however, a technique could be developed to perform focus error estimation without iterative search and without additional optical components, then one could obtain the benefits of contrast and phase detection methods without their disadvantages.

SUMMARY

In one embodiment of the present invention, focus error of an optical system is estimated after receiving image data of an object onto a sensor array of an optical system by calculating a filter response value for each of one or more defocus filters for the optical system, such that the calculated response values comprise a filter response vector of the received image data, then identifying the probability of each possible defocus level, and from these probabilities estimating the defocus level. In this way, the focus error is estimated without splitting the optical path between the objective lens and the sensor array, and the final step of the determination becomes a relatively simple algebraic calculation on the filter response vector of the received image data. Thus, focus error is determined in one computational step, for a much more efficient process as compared to the contrast technique and without the complicated hardware components of the phase detection technique.

In other aspects of the invention, a method for estimating focus error in an image comprises collecting a set of image patches to obtain a statistical description of images. The method further comprises representing an optical system by a point-spread function for each of multiple defocus levels within a range of defocus levels. Additionally, the method comprises representing a sensor array by at least a wavelength sensitivity function and a spatial sampling function. In addition, the method comprises computing a set of defocused image patches falling on the sensor array with the point-spread function for each of the multiple defocus levels. Furthermore, the method comprises sampling each of the set of defocused image patches on the sensor array using the sensor array's wavelength, spatial-sampling and noise functions. The method further comprises obtaining responses from the sensor array for a given class of sensor. In addition, the method comprises generating a set of defocus filters from the sensor responses from the sensor array for each of the multiple defocus levels. In addition, the method comprises determining a parametric description of the filter response distributions for each of the multiple defocus levels for a set of images patches. Additionally, the method comprises computing, by a processor, the focus error from an arbitrary filter response vector and the parametric descriptions of the filter response distributions.

Other forms of the embodiment of the method described above may be provided in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
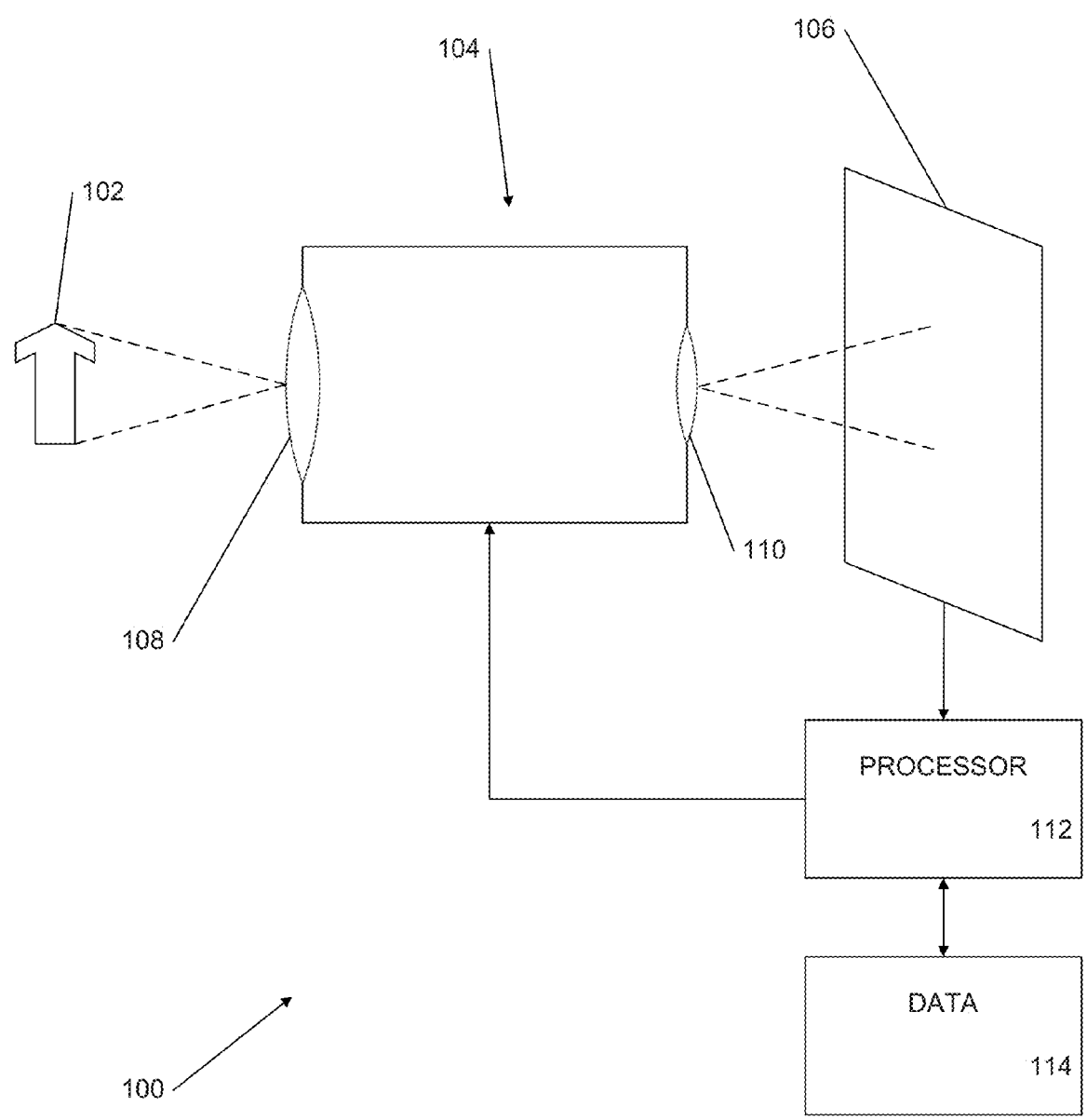
FIG. 1 is a schematic diagram of a system configured in accordance with an embodiment of the present invention.

The present invention comprises a method, system, and computer program product for estimating the defocus (i.e., focus error) in images. In one embodiment of the present invention, an optical system is represented by a wave optics model of the point-spread function and a sensor array is represented by wavelength sensitivity, spatial sampling, and noise functions for each sensor class. A training set of sharp image patches is collected. The point-spread function is computed for each of multiple defocus levels within a specified range, for each sensor class. Furthermore, the point-spread function for each of the defocus levels is applied to each image patch, which is then sampled using the wavelength sensitivity and spatial sampling functions for each type of sensor in the sensor array. Noise is added to the sampled response from each sensor element of each type of sensor in the sensor array. The sensor responses from the sensor array are used to generate a set of optimal defocus filters, via a statistical learning procedure. The optimal defocus filters are then applied to the sensor responses to each image patch in the training set. The joint filter response distributions for each of the multiple defocus levels in the training set of image patches are determined (i.e. the conditional likelihood distributions) and are characterized with a parametric function (e.g. a multi-dimensional Gaussian function).

The preceding steps indicate how the optimal defocus filters are learned. The steps described below indicate how the optimal defocus filters are used to obtain optimal defocus estimates for arbitrary image patches.

To estimate the focus error of an arbitrary patch with an arbitrary focus error, the filter response vector (i.e. the response of each filter) to the arbitrary image patch is calculated. The filter response vector and the parametric descriptions of the training filter response distributions are used to determine the probability of each possible defocus level within a specified range. From this probability distribution, a continuous Bayes' optimal estimate of the focus error is obtained. In this manner, a software technique has been developed to perform focus error estimation without the expensive hardware requirements of the phase detection autofocusing method. It has the additional advantage that it can be applied to "live-view" mode and that it can be implemented in cellphone cameras, mirrorless-lens-interchangeable cameras, point-and-shoot cameras, and other imaging systems that currently use contrast measurement autofocusing and that are too small or have too low a price-point to implement phase detection autofocusing.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1 is a schematic diagram of a system configured in accordance with an embodiment of the present invention. The system 100 receives light from an external object 102 into an optical system 104 that images the object light onto a sensor array 106. The optical system is schematically represented in FIG. 1 by an objective lens 108 and a pupil lens 110 that are movable relative to each other to adjust focus of the optical system 104, but it should be understood that any number and arrangement of optical elements that can be adjusted to focus object light onto the sensor array 106 may be used. A variety of components may be utilized for the sensor array 106, which may comprise, for example, photoelectric sensors that generate electrical energy in response to receiving light of a predetermined wavelength, such as long (e.g. red), medium (e.g. green), or short (e.g. blue) wavelength light. In a typical system 100, the sensor array 106 includes multiple sensors for red light and multiple sensors for blue light. Each sensor in the array generates a small electrical current in accordance with the intensity of light it receives. Each sensor is referred to as a pixel of the received sensor image.

The electrical current from each of the sensors of the array 106 is provided to a processor 112 for computation. The processor utilizes focus error data, described further below, that is read from a data store 114, such as a memory. The processor determines the sign and magnitude of the focus error in the received image, in accordance with its processing based on the data in the memory 114, and determines the focus error of the received image. The processor 112 can compensate for the determined focus error by adjusting the optical system 104 to implement the compensating directional sign (e.g., either back focus or front focus) and compensating magnitude such that the received image is substantially in focus at the sensor array 106. That is, based on one set of received image data from the sensor array, the processor 112 can calculate the adjustment to the optical system 104 that will be required to bring the received image into focus in one actuation of the optical system. The optical path through the optical system is a direct optical path, in the sense that the optical path from the object 102 to the sensor array 106 is a path that is not interrupted with intervening structures that disperse the collected light. That is, the optical path contains no beam splitters or the like. Thus, the iterative focus technique of contrast focus systems is avoided, and the complicated optical path and prisms of phase detection focus systems is not needed.

The system 100 that utilizes the focus error estimation described herein may be embodied in a variety of devices that include a sensor array that receives light through the optical system. For example, the optical system may be placed in a digital camera having a photosensitive sensor array and a lens focus system that can adjust the focus of the optical system in accordance with the estimated focus error. Other devices that may utilize the focus error estimation described herein include a digital microscope having a photosensitive sensor array and a lens focus system that can adjust the focus of the microscope's optical system in accordance with the estimated focus error. Similarly, the exemplary device may comprise a digital telescope having a photosensitive sensor array and a lens focus system that can adjust the focus of the telescope's optical system in accordance with the estimated focus error. Another exemplary device that may utilize the focus error estimation described herein can comprise a digital video camera having a photosensitive sensor array and a lens focus system that receives images on the sensor array comprising frames of video, and can adjust the focus of the video camera's optical system in accordance with the estimated focus error. That is, each frame of video may achieve focus using the techniques described herein. A wide variety of mechanical devices controlled by digital camera systems and analysis systems receiving image input may benefit from using the techniques described herein for focus estimation and device control. For example, micro-fabrication, robotics, and expert systems may benefit from the techniques described herein. Other suitable devices and systems for use with the focus error determining technique described herein will occur to those skilled in the art.

Figure 2:
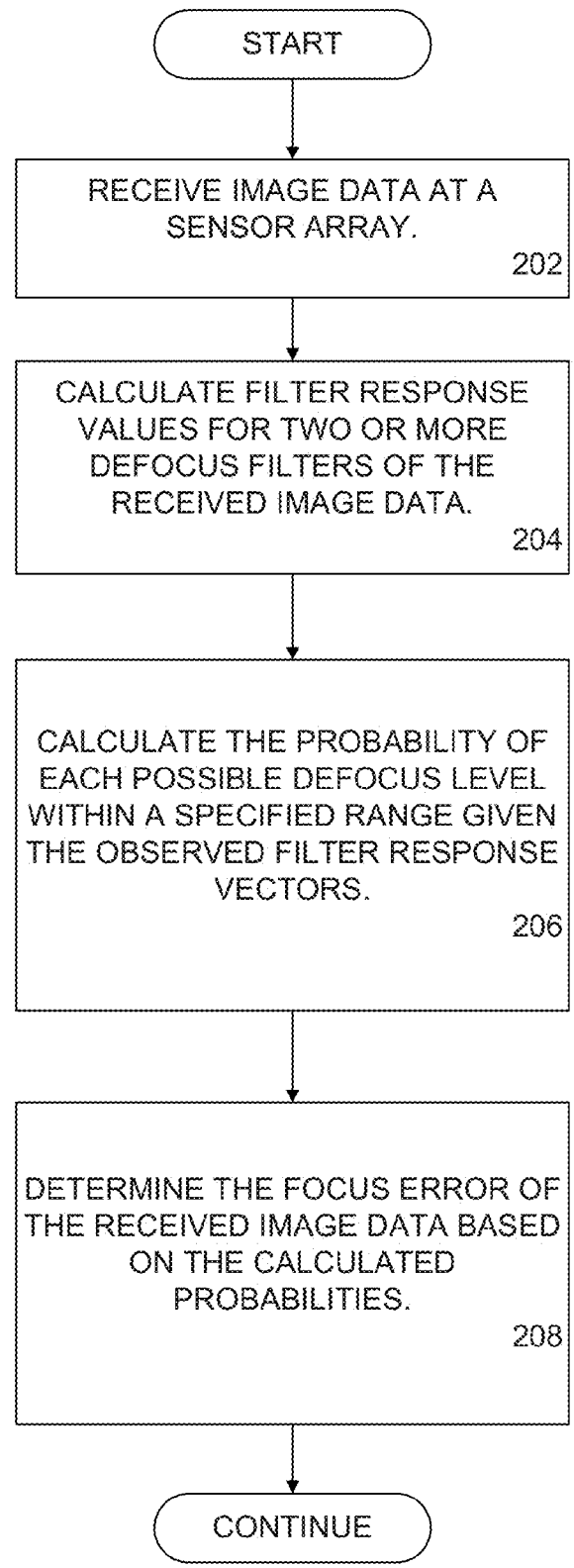
FIG. 2 is a flow diagram that illustrates the operation of the FIG. 1 system for determining estimated focus error in the system of FIG. 1.

FIG. 2 is a flow diagram that illustrates the operations described for determining focus error. In the first operation 202, image data is received at the sensor array through the optical system from the external object. After the image data is generated from each pixel of the sensor array, at the next operation 204, filter response values of the received image data are calculated for each of one or more defocus filters for the optical system, such that the calculated response values comprise a filter response vector of the received image data. In the illustrated embodiment, the set of defocus filters are identified using a statistical learning technique, described further below. The filter response values are computed for one or more sensor types in the array. For example, the sensor array may include photosensitive pixels that are sensitive to, respectively, light waves that are red, blue, or green. If the sign of the focus error is to be estimated, the filters will process image data from at least two of those three sensor channels, selected arbitrarily. If only the magnitude is to be estimated, the filters will process data from one or more of the sensor channels.

In estimating focus error, the system next calculates the probability of each possible defocus level within a specified range given the observed filter response vectors. This is represented by the flow diagram box numbered 206. The next step in the defocus processing, at box 208, is to obtain an estimate of the focus error of the received image data based on the computed probabilities of each defocus level. Standard techniques are used to obtain Bayes' optimal estimates of focus error from the probability distribution (e.g. minimum mean-squared error (MMSE) or maximum a posteriori (MAP) estimates). The focus error determined in this way can provide both the sign (direction) of the focus error and the magnitude of the focus error. The mathematical details of generating the filter response vectors to the training stimuli will be described further below.

Figure 3:
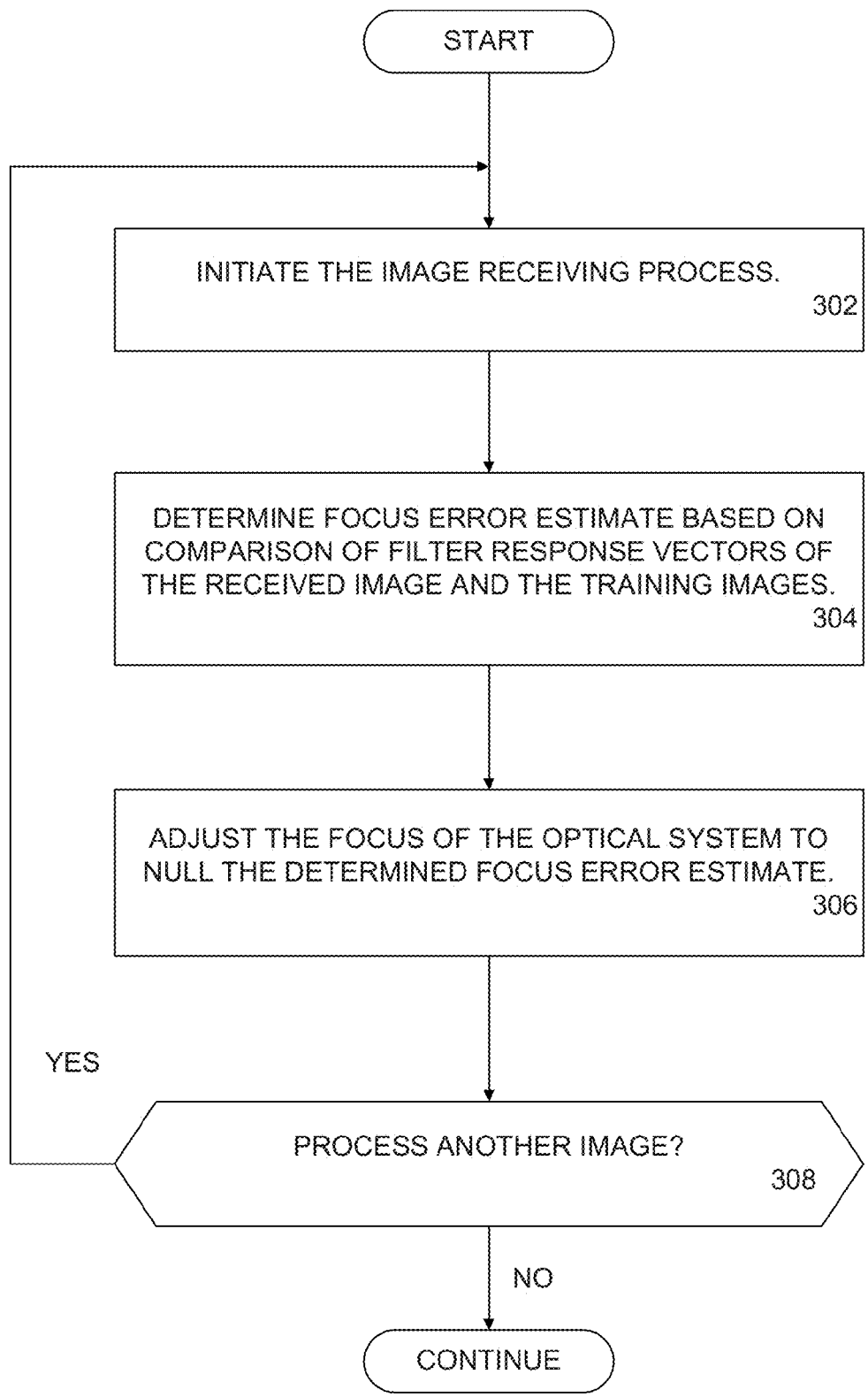
FIG. 3 is a flow diagram that illustrates focus adjustment in a device that utilizes the focus error determination of the FIG. 1 system.

FIG. 3 provides a flow diagram that illustrates the operation of the focus error estimation technique as applied to a device.

In the first operation of FIG. 3, corresponding to the first box 302, the image receiving process is initiated by a user of the device. For example, if the device is a digital camera, the user may depress a shutter button sufficiently to initiate image processing but not sufficient to initiate image capture. Such "image preview" operations are well-known in conventional digital cameras. Similar image preview operations may be available in digital cameras, video cameras, digital microscopes, or digital telescopes that are constructed in accordance with the present invention. The next operation, at box 304, is to determine the estimated focus error in the received image using the technique described in this document, for example, as described in conjunction with the FIG. 2 operation. After the focus error is determined, at the box 306, the focus of the optical system in the device is adjusted in a single operation to accommodate the estimated error and move the components of the optical system so as to bring the external object substantially into proper focus. The user can then proceed to process another image, a "yes" outcome at the decision box 308, or the user may proceed with image capture of the received image, a "no" outcome at the decision box. In the case of a "yes" outcome, the device operation cycles back to the image receiving process at box 302.

Figure 4:
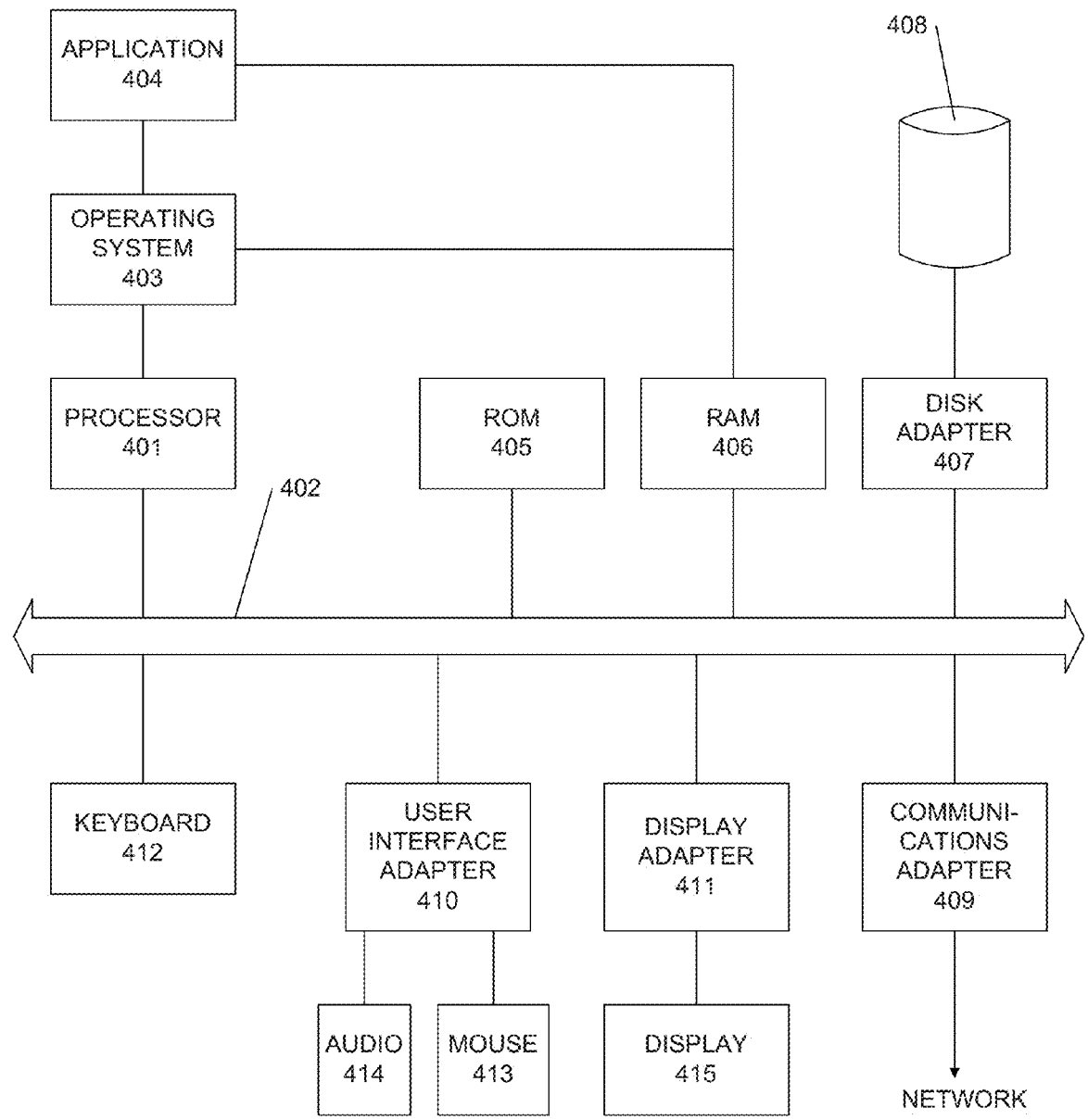
FIG. 4 is a block diagram showing details of a computer system configured in accordance with an embodiment of the present invention.

FIG. 4 is a block diagram showing details of a computer system configured in accordance with an embodiment of the present invention. FIG. 4 illustrates an embodiment of a hardware configuration of a computer system 400 that is representative of a hardware environment for practicing the present invention. In FIG. 4, the computer system 400 may include a processor 401 coupled to various other components by a system bus 402. An operating system 403 may run on the processor 401 so as to provide control and coordinate the functions of the various components of FIG. 4. Program instructions may be executed by the processor 401 through the operating system 403 to provide an application 404 in accordance with the principles of the present invention that implements the various functions or services to be performed in accordance with the description herein. The application 404 may include, for example, functions and operations for estimating defocus in images as discussed further below.

Referring again to FIG. 4, a read-only memory ("ROM") 405 may be coupled to the system bus 402 and may include a basic input/output system ("BIOS") that controls certain basic functions of the computer system 400. A random access memory ("RAM") 406 and a disk adapter 407 may also be coupled to the system bus 402. It should be noted that software components including the operating system 403 and application 404 may be loaded into the RAM 406, which may be the main memory of the computer system 400 for execution. The disk adapter 407 may be an integrated drive electronics ("IDE") adapter or the like that communicates with a storage unit 408, e.g., a memory unit, hard disk drive, or solid state drive. It is noted that the program for estimating defocus in images as discussed further below may reside in the disk unit 408 or in the application 404.

The computer system 400 may further include a communications adapter 409 coupled to the bus 402. A communications adapter 409 may interconnect the bus 402 with an outside network (not shown) through a network interface, thereby allowing the computer system 400 to communicate with other similar devices. Alternatively, the computer system 400 may be embedded within a device such as a camera or digital microscope, each having an optical system that directs light from an object onto a sensor array such that the optical system can be adjusted to proper focus in accordance with the description herein.

Input/output (I/O) devices may also be connected to the computer system 400 via a user interface adapter 410 and a display adapter 411. A keyboard 412, mouse 413, and a speaker 414 may all be interconnected to the bus 402 through the user interface adapter 410. Data may be input to the computer system 400 through any of these devices. A display monitor 415 may be connected to the system bus 402 by the display adapter 411. In this manner, a user can provide inputs to the computer system 400 through the keyboard 412 or mouse 413, and can receive output from the computer system 400 via the display 415 or speaker 414.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer-readable signal medium or a non-transitory computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable storage medium would include the following: a portable computer diskette, a hard disk, a random access memory (RAM), a read-only memory (ROM), an erasable programmable read-only memory (EPROM or flash memory), a data storage media such as a compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, phase detection autofocusing is achieved by dividing the incoming light into pairs of images and comparing them. The system couples a beam splitter, a small secondary mirror, and two optical prisms to direct the light to a dedicated autofocusing sensor in the optical system. Two optical prisms capture the light rays coming from the opposite sides of the lens and divert them to the autofocusing sensor, creating a simple rangefinder with a base identical to the lens diameter. The two images are then analyzed for similar light intensity patterns (peaks and valleys) and the phase difference is calculated in order to find if the object is in front focus or back focus position. While the phase detection method is fast and accurate and estimates defocus sign, it is very costly to implement since it requires special beam splitters, mirrors, prisms, and sensors. Furthermore, the extra hardware increases the size and weight of the optical system. Additionally, such a method cannot operate in video mode or "live-view" mode (a feature that allows an optical system's display screen, such as a digital camera's display screen, to be used as a viewfinder). If, however, a software technique could be developed to perform optimal focus error estimation, then the expensive hardware requirements of the phase detection autofocusing method would no longer be required. Furthermore, the weight of the optical system would be decreased.

Thus, using the focus error estimation described herein, the improved performance that is sometimes associated with relatively larger phase detection systems may be obtained in smaller systems, such as camera systems for mobile telephones, interchangeable lens cameras without a mirror (i.e., not single-lens-reflex cameras), and the like that currently use contrast detection focus systems.

Figure 5:
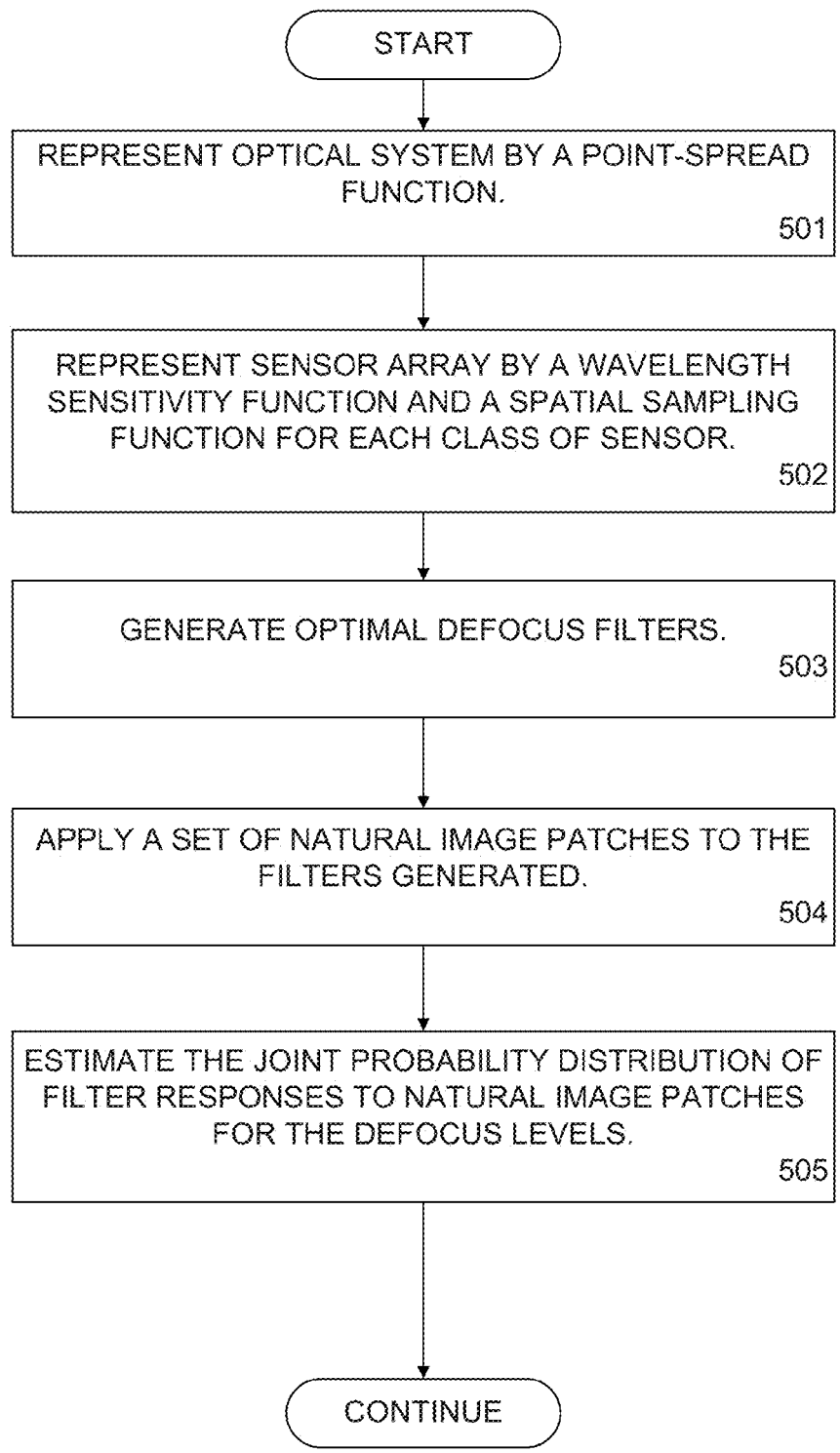
FIG. 5 is a flow diagram that illustrates estimating the focus error in images in accordance with an embodiment of the present invention.
Figure 6:
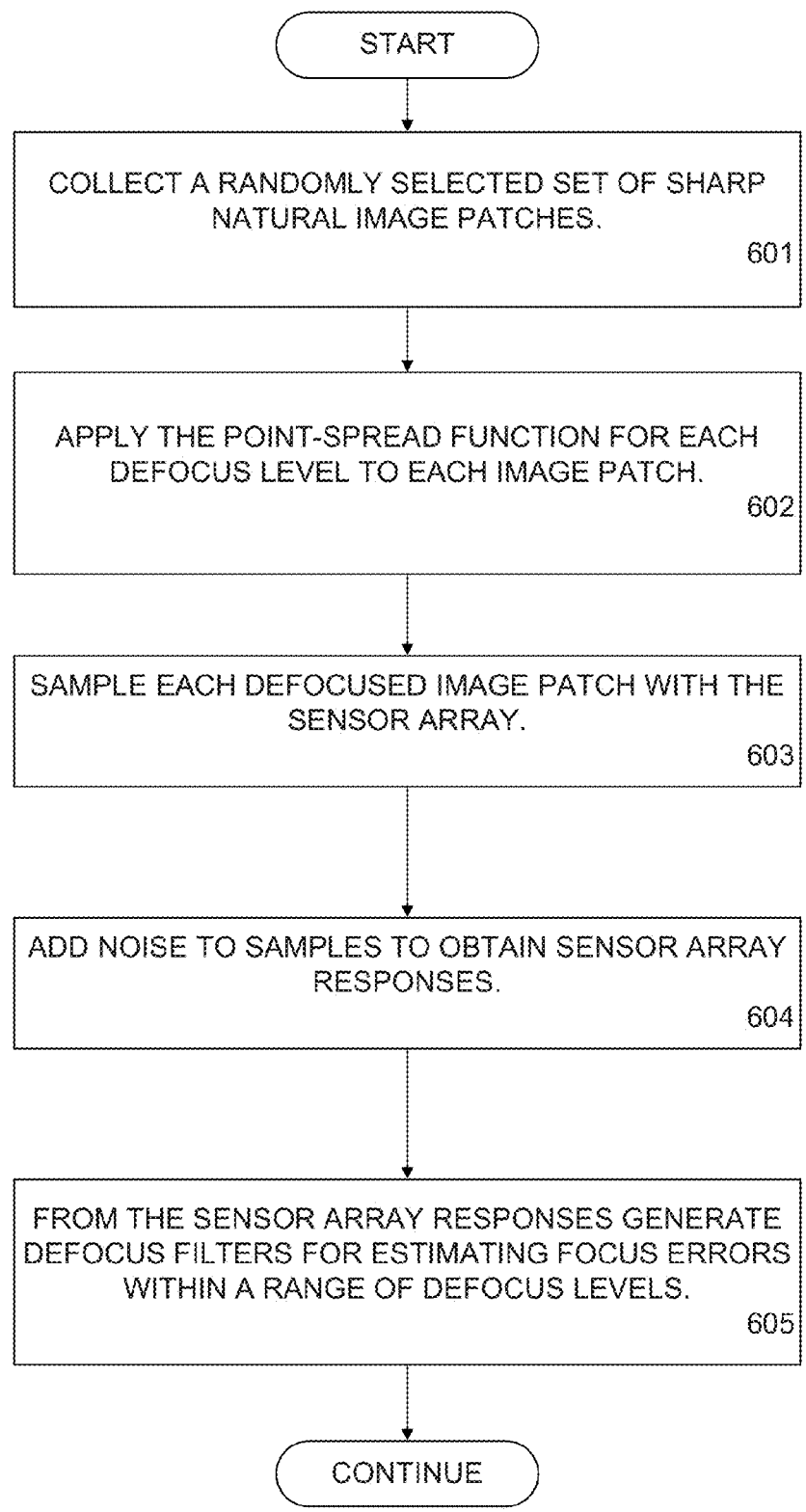
FIG. 6 is a flow diagram that illustrates generating defocus filters in accordance with an embodiment of the present invention.

The principles of the present invention provide a technique for performing focus error estimation without the slow iterative procedure required by contrast measurement and without the expensive hardware requirements of the phase detection autofocusing method that can be applied to "live-view" mode as discussed further below. FIG. 5 is a flowchart of a method for estimating the focus error in images obtained through an optical system. FIG. 6 is a flowchart of a method for generating optimal defocus filters.

Referring to FIG. 5, the first operation 501 indicates that the optical system (e.g., a digital camera or digital microscope) is modeled or represented by a point-spread function.

Prior to discussing the modeling of the optical system, a brief discussion of the concept of defocus is deemed appropriate. The defocus of a target image region is defined as the difference between the lens system's current power and the power required to bring the target region into focus as shown below in Equation (EQ 1):

$$\Delta D = D_{focus} - D_{target} \quad (EQ\ 1)$$

That is, the technique described herein estimates the focus error ($\Delta D$), also referred to as the defocus, in each local region of an image, such as a natural image or computer-generated image (or any other class of image).

Estimating defocus, like many visual estimation tasks, suffers from the "inverse optics" problem: It is impossible to determine with certainty, from the image alone, whether image blur is due to defocus or some property of the scene (e.g., fog). Focus error estimation can suffer from a sign ambiguity. Under certain conditions, a point target that is the same dioptric distance nearer or farther than the focus distance will be imaged identically. However, there are a number of constraints which the technique described herein exploits to make a solution possible.

In the described approach to focus error estimation, the input from a scene can be represented by an idealized image $I(x, \lambda)$ that gives the radiance at each location $x=(x,y)$ in the plane of the sensor array of the optical system, for each wavelength $\lambda$. In general, an optical system degrades the idealized image and can be represented by a point-spread function given by $psf(x, \lambda, \Delta D)$, which describes the spatial distribution of light across the sensor array produced by a point target of wavelength $\lambda$ and defocus $\Delta D$. The point-spread function can be expanded to make the factors determining its form more explicit, as follows, in Equation (EQ 2):

$$psf(x, \lambda; a(z), W(z, \lambda, \Delta D)) \quad (EQ\ 2)$$

where $a(z)$ specifies the shape, size and transmittance of the aperture, and $W(z, \lambda, \Delta D)$ is a wave aberration function, which depends on the position z in the plane of the aperture, the wavelength of light $\lambda$, the defocus level $\Delta D$, and other aberrations introduced by the lens system. A defocus level refers to how many diopters, if any, the image is out of focus. The aperture function determines the effect of diffraction on the optical quality of the lens system. The wave aberration function determines degradations in image quality not attributable to diffraction. A perfect lens system (i.e., a lens system limited only by diffraction and defocus) converts light originating from a point on a target object to a converging spherical wavefront. The wave aberration function describes how the actual converging wavefront differs from a perfect spherical wavefront at each point in the pupil aperture.

In the next operation 502, a sensor array is represented by a wavelength sensitivity function $s_c(\lambda)$, a spatial sampling function $samp_c(x)$ for each class of sensor c, where a class of sensor refers to those sensors with the same wavelength sensitivity profile (spectral sensitivity function). For example, one class of sensors may be used to sense long wavelength (e.g. red) light while another class may be used to sense short wavelength (e.g. blue) light. These two sensor classes must have different wavelength sensitivity functions. In one embodiment, two or more sensor classes are used to take advantage of chromatic aberrations, which may be used to determine the sign of the defocus (i.e., the direction of focus error) as discussed further herein. That is, two or more sensor classes are used to take advantage of chromatic aberrations, which may be used to determine if the object is in front focus or back focus, in addition to continuously estimating the magnitude of defocus. In another embodiment, one or more sensor classes are used to take advantage of monochromatic aberrations (e.g., astigmatic and spherical aberrations). Monochromatic aberrations and chromatic aberrations may be used simultaneously to estimate the defocus in images (such as natural images or any other class of images, including images such as computer-generated images). The spatial sampling function $samp_c(x)$ is used for sampling each portion of the image (referred to herein as the "patch") for the particular class of sensor.

In the next operation 503, optimal defocus filters are determined. In one embodiment, the spatial frequency filters that are most diagnostic of defocus are discovered and subsequently the filter responses are used to obtain continuous focus error estimates as discussed further herein. A detailed description of the sub-steps of the operation 503 for generating optimal defocus filters are discussed below in conjunction with FIG. 6.

Referring to FIG. 6, in the first operation 601, a set of randomly selected well-focused (i.e., sharp) image patches (e.g., portions of images) are collected. The image patches are then defocused with the point-spread function for each defocus level within a range of defocus levels. For example, in a typical digital camera system, the defocus levels may lie within a range of defocus levels such as ranging from approximately −2.25 diopters to approximately 2.25 diopters. The range of defocus levels can be matched to the focusing range of the optical system. The range of defocus levels is arranged in discrete, incremental diopter steps (e.g., in steps of 0.25 diopter steps). The incremental diopter step size should be adjusted as necessary to ensure good continuous estimation performance for the device. More particularly, the range of defocus levels and the spacing of the discrete diopter steps are predetermined according to the available aperture settings and focus range of the system that will be performing the focus error estimate computations. Other ranges of defocus levels and incremental diopter steps will be selected in accordance with system resources and the application (e.g., digital camera, digital microscope, digital telescope, or digital video camera), as will be known to those skilled in the art.

It should be noted that an image patch, comprising the sensor array data for any individual image, is typically limited to an arbitrary pixel patch area in the image. For example, the patch area for which the computations of power spectra, transforms, and the like, are carried out may comprise an image area corresponding to a focus reticle of the optical system as viewed by a user. The size of such patch areas is typically on the order of a 64×64 pixel area or a 128×128 pixel area located in the center of the image.

In the next operation 602, the point-spread function is applied for each defocus level to each image patch.

In the next operation 603, each defocused image patch is sampled by the sensor array represented by the wavelength sensitivity function $S_c(\lambda)$ and spatial sampling function $samp_c(x)$ for each class of sensor c.

In addition, a noise function may be included in the computation. The noise function may comprise, for example, a random value for noise to be added as a simulation (proxy) for noise level in the optical system, such as in noise in the response of the sensors in the optical system.

In the next operation 604, the responses from the sensor array are obtained for a given class of sensor. In the operation 605, optical defocus filters are generated from the responses from the sensor array for each of the defocus levels. A typical number of defocus filters for the optical system is from six to eight. The number of defocus filters will be determined by the system resources that are available and the desired accuracy of operation. As noted above, the defocus filters can be determined by a statistical learning technique. The defocus filters represent the features of the images in the training set that are diagnostic of the focus error.

In one embodiment, the optimal defocus filters are obtained via a technique referred to as Accuracy Maximization Analysis (AMA), a task-focused statistical technique for dimensionality reduction. The AMA technique substantially outperforms traditional methods of dimensionality reduction like Principle Component Analysis (PCA). Indeed, the AMA technique returns the optimal filters (i.e., bases) for performing the task of defocus estimation. The AMA technique is described, for example, in Geisler, W. S.; Najemnik, J.; and Ing, A. D. (2009) in Optimal Stimulus Encoders for Natural Tasks, Journal of Vision 9(13):17, 1-16 ("AMA document"). The AMA document is incorporated herein by reference.

In one embodiment, the spatial pattern of responses for a given class of sensor is as follows in Equation (EQ 3):

$$r_c(x) = \left( \sum_\lambda [I(x, \lambda) * psf(x, \lambda, \Delta D)] s_c(\lambda) \right) samp_c(x) + \eta_c(x) \quad (EQ\ 3)$$

where * represents two-dimensional convolution in x, and $\eta_c(x)$ represents a noise function for the sensor class c. The defocus is estimated from the spatial patterns of responses, given by EQ 3, for the available sensor classes.

An alternative, suitable approximation to the $r_c(x)$ equation above may be obtained as follows (EQ 3A):

$$r_c(x) = [I_c(x) * psf_c(x, \Delta D)] samp_c(x) + \eta_c(x) \quad (EQ\ 3A)$$

where the $r_c(x)$ approximation of Equation EQ 3A gives the sensor response for a sensor class c, and where each image channel was obtained by taking the dot product of the wavelength distribution at each pixel with the sensor wavelength sensitivity, and where represents a noise function for the sensor class c. The sensor response resulting from this calculation is referred to as the "color channel" sensor response.

The data that is received from the sensor array may be used to learn how to estimate the defocus, such as by looking at the power spectrum of the sensor responses for each patch of image and for each defocus level. In one embodiment, the power spectrum of the sensor responses may be obtained by performing a transform for each sampled image patch. The transform may comprise, for example, a Fast Fourier Transform (FFT); other transforms are also possible: e.g. a cosine transform, or a Hartley transform. Other suitable transforms will be known to those skilled in the art. In this manner, one may be able to compare the spatial frequency content (i.e. the relative amounts of fine and course detail) in a given patch of image to the relative amounts that are characteristic of different defocus levels.

Defocus filters may be determined for sensor arrays with more than one sensor class so that chromatic aberrations can be used to estimate both the magnitude and the sign of defocus. In addition, defocus filters determined for different orientations within one sensor class may be used so that monochromatic aberrations can be used to estimate both the magnitude and the sign of defocus.

Returning to FIG. 5, in the operation 504, a training set of image patches, such as the image patches received in the first operation 601 of FIG. 6, is applied to the filters generated in the operation 605 of FIG. 6.

In the next FIG. 5 operation of 505, the joint probability distribution of filter responses to the image patches for the defocus levels is estimated. Specifically, for each defocus level, the filter responses are fit with a Gaussian distribution by calculating the sample mean and covariance matrix. In one embodiment, a vector of responses is output from the sensor array for each defocus level, represented by the vector R. Given an observed filter response vector R, a continuous defocus estimate is obtained by computing a weighted sum of the posterior probabilities across a set of discrete defocus levels in Equation (EQ 4) (discussed further below):

$$\Delta \hat{D} = \sum_{j=1}^{N} \Delta D_j p(\Delta D_j \mid R) \quad (EQ\ 4)$$

where $\Delta D_j$ is one of the N trained defocus levels and $p(\Delta D_j|R)$ is the posterior probability of that defocus level given the observed vector of filter response R. Other estimation methods (e.g. MAP estimation) may be more appropriate when the posterior probability distributions are often bimodal, as occurs with low levels of chromatic aberration; defocus sign is more difficult to estimate with low levels of chromatic aberration. Bayes' rule gives the posterior probability of each specific defocus level $\Delta D_j$ in Equation (EQ 5):

$$p(\Delta D_j \mid R) = \frac{p(R \mid \Delta D_j) p(\Delta D_j)}{\sum_{k=1}^{N} p(R \mid \Delta D_k) p(\Delta D_k)} \quad (EQ\ 5)$$

where $p(R|\Delta D_j)$ is the likelihood of the observed filter response vector given that defocus level, and $p(\Delta D_j)$ is the prior probability of that defocus level. In one embodiment, it is assumed that the likelihood for each defocus level is a multivariate Gaussian (one dimension per filter) with mean vector and covariance matrix $\Sigma_j$ (Equation EQ 6):

$$p(R|\Delta D_j) = \text{gauss}(R; \mu_j, \Sigma_j) \quad \text{(EQ 6)}$$

where $\mu_j$ and $\Sigma_j$ were set to the sample mean and covariance matrix of the raw filter responses. Other parametric descriptions of the filter response distributions may provide better performance. If the prior probabilities of the defocus levels are equal, then the prior probabilities will be factored out of EQ 5. In many instances, however, the prior probability of different defocus levels will not be equal, especially if focus distance is taken into account. For example, if the lens is focused on optical infinity, there is a zero probability that defocus is positive (i.e., that the target is beyond optical infinity). This information can be used to increase accuracy of estimates.

Increasing the number of discrete defocus levels in the training set increases the accuracy of the continuous estimates. That is, identification of discrete defocus levels becomes equivalent to continuous estimation as the number of levels increases. However, increasing the number of discrete defocus levels increases the training set size and the computational complexity of learning filters. In practice, with a 2 mm aperture, for example, excellent continuous estimates are obtained using 0.25 diopter steps for training, followed by interpolation to estimate Gaussian distributions between steps. Interpolated distributions are added until the maximum Mahalanobis distance (i.e., d-prime distance) was less than or equal to 0.5. These details may change with a different aperture, or a new optical system.

In a system for which the techniques described herein are used for estimating focus error of a received image, the filter responses as described above may be combined to estimate the defocus of an image patch in a received image. In view of the description herein, those skilled in the art will understand that estimates of focus errors are obtained with the simple weighted summation formula as shown in EQ 4. The vector of filter responses is obtained by taking the dot product of each spatial-frequency filter with the normalized, logged amplitude spectrum of the sensor responses to the patch. As discussed above, the posterior probabilities are obtained by applying Bayes' rule with the fitted multi-dimensional Gaussian probability distributions. EQ 4 gives the Bayes optimal estimate that minimizes the mean-squared error of the estimates when N is sufficiently large. Other estimation techniques may be used, and will be known to those skilled in the art.

Equations EQ 3 (or EQ 3A) and EQ 4 may be applied to arbitrary image patches to obtain an estimate of defocus. These estimates may be used by the optical system to refocus the lens. The focus error, in conjunction with an estimate of focus distance, can also be used to estimate depth, which may be useful for computational vision applications. It should be noted that estimating depth is not necessary for the operation of digital cameras; nevertheless, depth estimates can be obtained with an estimate of focus error and an estimate of focus distance. That is, by having an accurate estimate of the defocus at every point in an image, an estimate of the distance to the corresponding point in the scene can be easily computed, if the focus distance is known. The precision of defocus-based distance estimates depends on the distances to be estimated: for a given aperture size (i.e. f-number), distance estimates from defocus are more precise for near than far distances. The precision of defocus-based distance estimates also depends on the size of the optical system's aperture: for a given focus distance, distance estimates from defocus are more precise for large apertures than small apertures (large apertures produce shallower depth-of-field). Therefore, the method described in FIG. 5 is especially useful in applications, such as computational vision, robotics, or microfabrication applications concerned with estimating the distance to nearby objects.

FIGS. 7, 8, 9, and 10 provide illustrations of the process for using the focus filters and determining the defocus estimates as described above in connection with FIG. 5 and FIG. 6.

Figure 7:
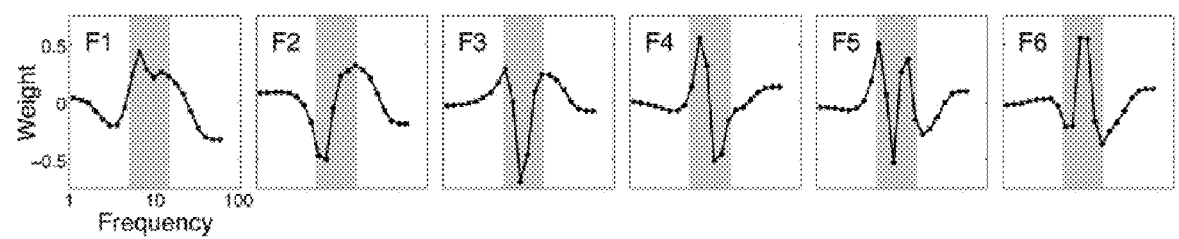
FIG. 7 shows defocus filters for an illustrative optical system such as illustrated in FIG. 1.

FIG. 7 shows six defocus filters that were selected for an optical system having diffraction-limited and defocus-limited optics, and sensors that are sensitive only to 570 nm light. The filters were selected using the techniques of the AMA Document noted above. FIG. 7 shows that the filters have several interesting features. First, they capture most of the relevant information; additional filters add little to overall accuracy. Second, they provide better performance than filters based on principal components analysis or matched templates. Third, they are relatively smooth and hence could be implemented by combining a few relatively simple, center-surround receptive fields like those found in retina or primary visual cortex. Fourth, the filter energy is concentrated in the 5-15 cycles per degree (cpd) frequency range, which is similar to the range known to drive human accommodation (4-8 cpd).

Figure 8:
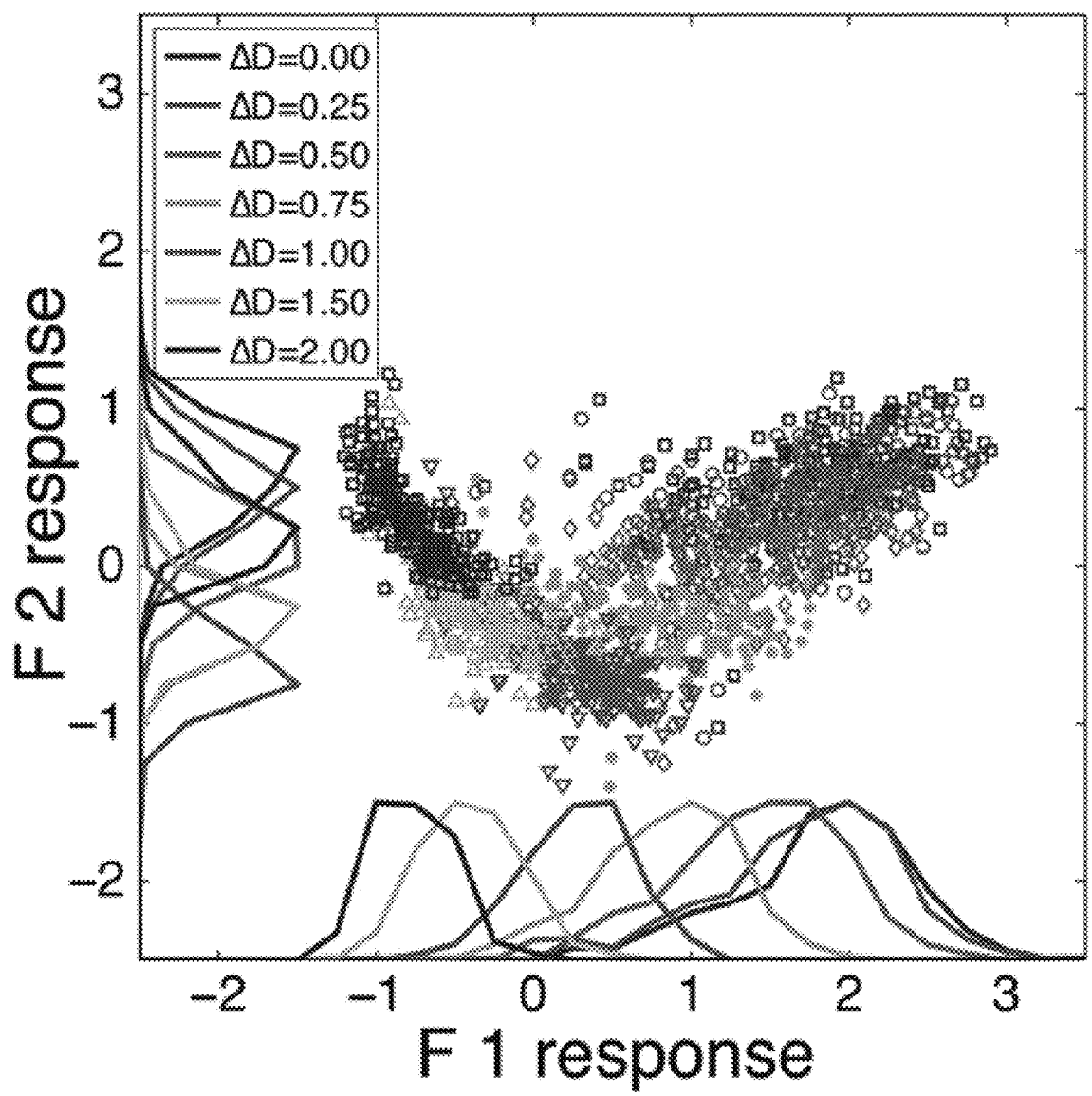
FIG. 8 shows responses to spectra in a training set of images for two of the FIG. 7 filters.

As noted above, the FIG. 7 filters selected according to the AMA Document encode information in local amplitude spectra relevant for estimating defocus. However, the Bayesian decoder built into the technique of the AMA Document can be used only with the training stimuli, because that decoder needs access to the mean and variance of each filter's response to each stimulus. In other words, the technique of the AMA Document finds only the optimal filters. The next step is to combine (pool) the filter responses to estimate defocus in arbitrary image patches, having arbitrary defocus level. A standard (i.e., typical) approach was selected. First, the joint probability distribution of filter responses to image patches is estimated for the defocus levels in the training set. For each defocus level, the filter responses are fit with a Gaussian distribution by calculating the sample mean and covariance matrix. FIG. 8 shows the joint distribution of the responses for the first two selected filters for several levels of defocus. More particularly, FIG. 8 shows filter responses to amplitude spectra in a range of defocus levels for the training set (response for defocus levels of 1.25, 1.75, and 2.25 diopters are not plotted in FIG. 8). The symbols represent joint responses from the two most informative filters. Marginal distributions are shown on each axis. Approximate centroids of symbol groups that correspond to each of the plotted defocus levels are indicated in FIG. 8

Figure 9:
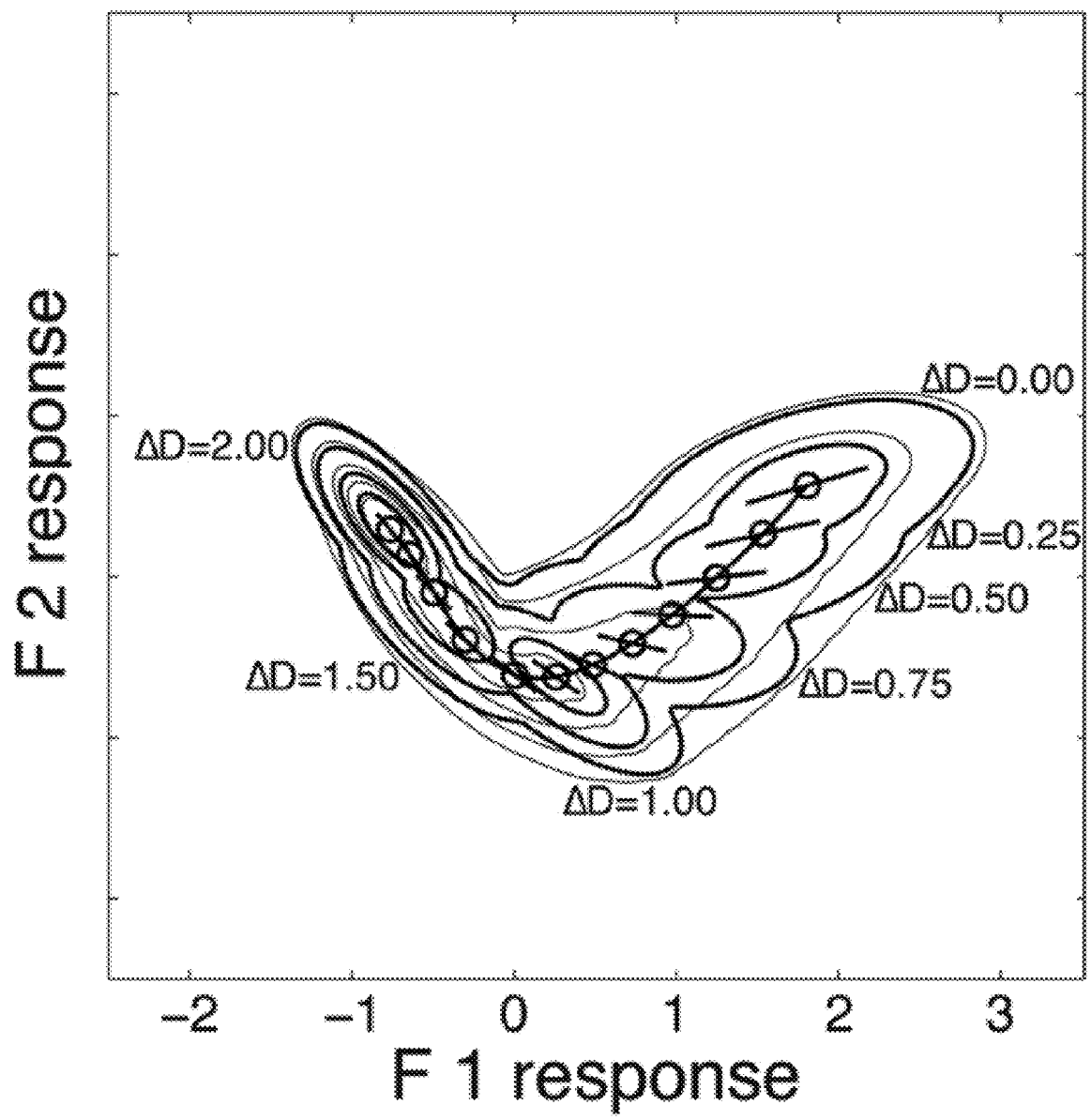
FIG. 9 shows Gaussian distributions fitted to the FIG. 8 filter responses.

FIG. 9 shows contour plots of the fitted Gaussians distributions. After the joint responses are determined, in the second step, using the joint distributions (which are six-dimensional, one dimension for each filter), defocus estimates are obtained with the weighted summation formula given by Equation EQ 4 above, where $\Delta D_j$ is one of the N trained defocus levels, and the conditional probability in EQ. 4 is the posterior probability of that defocus level given the observed vector of filter responses R. FIG. 9 shows Gaussian distributions fit to the filter responses. The thicker lines are iso-likelihood contours on the maximum-likelihood surface determined from fits to the response distributions at trained defocus levels. The thinner lines are iso-likelihood contours on interpolated response distributions. Circles in FIG. 9 indicate interpolated means separated by a d' (i.e., Mahalanobis distance) of 1. Line segments in FIG. 9 show the direction of principle variance and ±1 SD. The response vector is given by the dot product of each filter with the normalized, logged amplitude spectrum. The posterior probabilities are obtained by applying Bayes' rule to the fitted Gaussian probability distributions. Equation EQ. 4 gives the Bayes optimal estimate when the goal is to minimize the mean-squared error of the estimates and when N is sufficiently large, which it is in the illustrated case.

Figure 10:
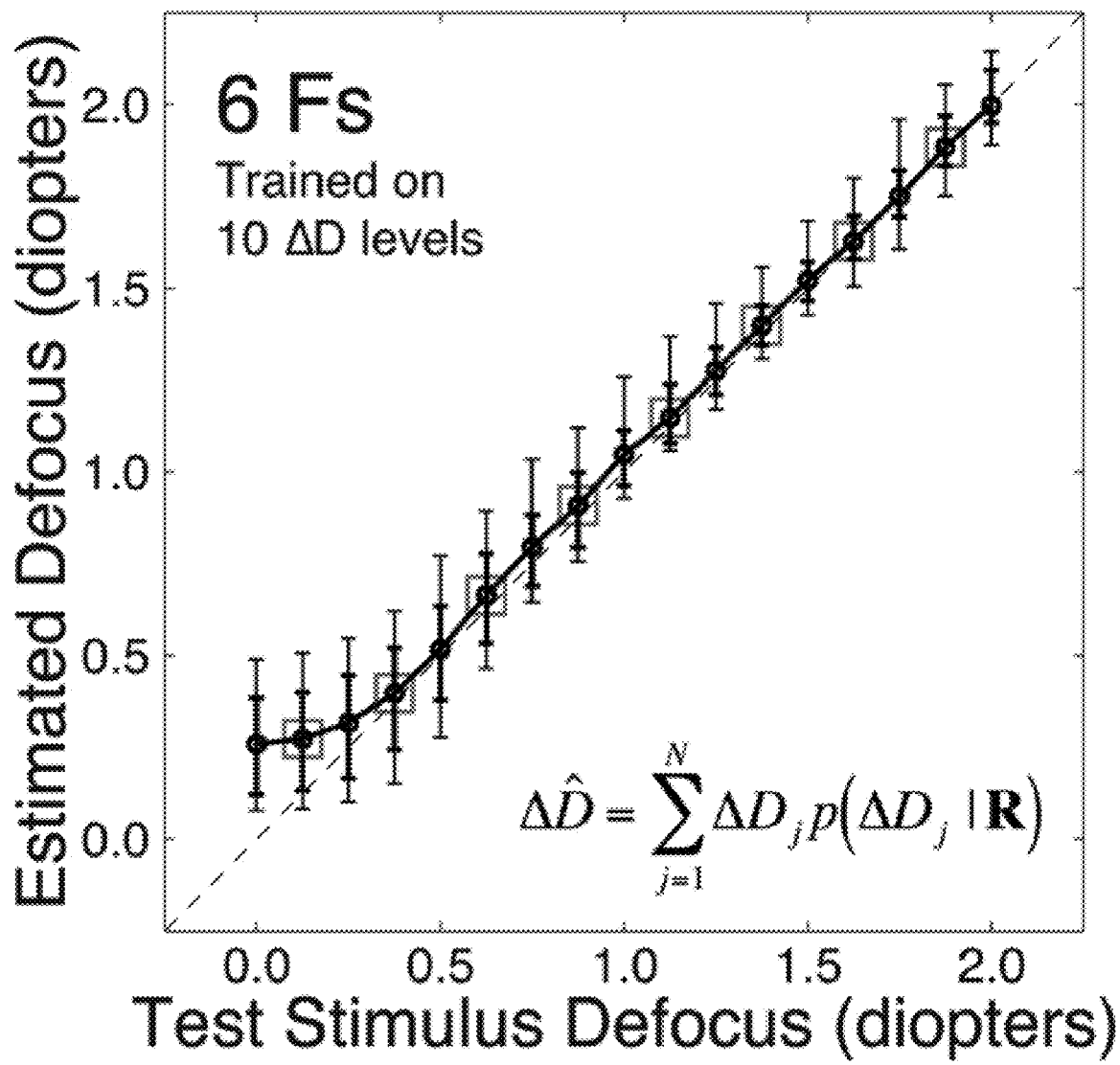
FIG. 10 shows defocus estimates for the training set of images.

FIG. 10 illustrates defocus estimates for the test patches, plotted as a function of defocus for the initial case of a vision system having perfect optics and a single class of sensor. None of the test patches were in the training set. More particularly, FIG. 10 shows defocus estimates for test stimuli not belonging to the training set of images. Symbols in FIG. 10 represent the mean defocus estimate for each defocus level. Vertical error bars represent 68% (thick bars) and 90% (thin bars) confidence intervals about the mean defocus estimate. Boxes indicate defocus levels not in the training set of images. The equal-sized error bars at both trained and untrained levels indicates that the described technique outputs continuous estimates.

In the results obtained, as illustrated in FIGS. 7, 8, 9, and 10, precision is relatively high and bias is relatively low, once defocus exceeds approximately 0.25 diopters, which is roughly the defocus detection threshold in humans. Precision decreases at low levels of defocus because a modest change in defocus (e.g., on the order of 0.25 diopters) does not change the amplitude spectra significantly when the base defocus is zero; more substantial changes occur when the base defocus is nonzero. The bias near zero occurs because, in vision systems having perfect optics and sensors sensitive only to a single wavelength, positive and negative defocus levels of identical magnitude yield identical amplitude spectra. Thus, the bias is due to a boundary effect: estimation errors can be made above but not below zero. Applying the method of FIG. 5 with more than one class of sensor can remove the bias near zero and can allow estimation of the sign of defocus (i.e., estimation of whether the focus is in front or behind the subject).

In some implementations, the FIG. 5 method may include other and/or additional steps that, for clarity, are not depicted. Further, in some implementations, the method may be executed in a different order presented and that the order presented in the discussion of FIG. 5 is illustrative. Additionally, in some implementations, certain steps in the FIG. 5 method may be executed in a substantially simultaneous manner or may be omitted.

For example, in one embodiment, it may not be strictly necessary to represent the optical system and sensor array to determine the optimal filters thereby avoiding steps 501 and 502, as long as a collection of image patches with known defocus levels are collected. Once this collection is received in the FIG. 6 operation 601, the responses may be obtained from the sensor array for a given class of sensor in step 604. That is, the only critical factor in generating the filters is obtaining a collection of sensor array responses for each of the defocus levels. Such an embodiment may be of particular usefulness in microscopy or microfabrication in which the objects being imaged all lie in one depth plane.

It should be understood that the principles of the present invention may be adapted to specific classes of image-capturing devices and imaged environments. For example, the techniques described herein may be tailored to be used for various settings (e.g., portrait, landscape, macro photography) of a digital camera. As noted above, other suitable devices for application of the techniques described herein include digital microscopes, digital telescopes, and digital video cameras. Other devices and adaptations for using the techniques described herein will occur to those skilled in the art.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

What is claimed is:

1. A method for focus error processing, the method comprising:
   receiving image data of an object onto a sensor array of an optical system;
   calculating a filter response value of a defocus filter to a patch of the received image data for each defocus filter in a set of one or more defocus filters for the optical system, such that the calculated filter response values for the set of defocus filters produces a filter response vector of the received image data;
   calculating a probability for each of multiple defocus levels within a predetermined set of defocus levels from the filter response vector of the received image data; and
   determining an estimate of focus error from the received image data based on the calculated probabilities of the multiple defocus levels;
   wherein calculating the probability of each of the multiple defocus levels comprises using a parametric function of a training set of images comprising image patches having defocus levels corresponding to the predetermined set of defocus levels to determine a probability for each defocus level of the predetermined set of defocus levels;
   wherein determining an estimate of focus error comprises selecting a defocus level from the predetermined set of defocus levels that is most similar to training filter response vectors associated with a defocus level.

2. The method as in claim 1, wherein selecting a defocus level comprises selecting from the predetermined set of defocus levels according to a Bayes' Rule technique to determine the most similar training filter response vector.

3. The method as in claim 1, wherein calculating a filter response value for each defocus filter in the set of one or more defocus filters comprises:
   calculating a Fourier transform of the patch of the received image data;
   computing a radially averaged power spectrum from the Fourier transform of the received image data; and
   calculating a dot product of the radially averaged power spectrum with each defocus filter to produce a response value for each filter;
   wherein the set of response values for the filters comprises the filter response vector.

4. The method as in claim 1, further comprising:
   adjusting the optical system to compensate for the determined estimate of focus error and to obtain an image at the sensor array that is substantially in focus.

5. The method as in claim 4, wherein the optical system comprises a digital camera.

6. The method as in claim 4, wherein the optical system comprises a digital microscope.

7. The method as in claim 4, wherein the optical system comprises a digital telescope.

8. The method as in claim 4, wherein the optical system comprises a digital video camera.

9. The method as in claim 4, wherein the optical system comprises a device that is controlled in response to the received image data.

10. A system for focus error processing, the system comprising:

an optical system;
a sensor array that receives image data of an object viewed through the optical system; and
a processor configured to calculate a filter response value of a defocus filter to a patch of the received image data for each of one or more defocus filters for the optical system, such that the calculated filter response values produce a filter response vector of the received image data,
calculate a probability for each of multiple defocus levels within a predetermined set of defocus levels from the filter response vector of the received image data, and
determine an estimate of focus error in the received image data based on the calculated probabilities of the multiple defocus levels;
wherein the processor is further configured to
calculate the probability of each of the multiple defocus levels using a parametric function of a training set of images comprising image patches having defocus levels corresponding to the predetermined set of defocus levels to determine a probability for each defocus level of the predetermined set of defocus levels, and
determine the estimate of focus error by selecting a defocus level from the predetermined set of defocus levels that is most similar to training filter response vectors associated with a defocus level.

11. The system as in claim 10, wherein the processor selects a defocus level by selecting from the predetermined set of defocus levels according to a Bayes' Rule technique to determine the most similar training filter response vector.

12. The system as in claim 10, wherein the processor calculates a filter response vector comprising a filter response value for each of the one or more defocus filters by calculating a Fourier transform of the patch of the received image data, computing a radially averaged power spectrum from the Fourier transform of the received image data, and calculating a dot product of the radially averaged power spectrum with each defocus filter to produce a response value for each filter, wherein the set of response values for the filters comprises the filter response vector.

13. The system as in claim 10, wherein the processor is further configured to adjust the optical system to compensate for the determined estimate of focus error and to obtain an image at the sensor array that is substantially in focus.

14. The system as in claim 13, wherein the optical system comprises a digital camera.

15. The system as in claim 13, wherein the optical system comprises a digital microscope.

16. The system as in claim 13, wherein the optical system comprises a digital telescope.

17. The system as in claim 13, wherein the optical system comprises a digital video camera.

18. The system as in claim 13, wherein the optical system comprises a device that is controlled in response to the received image data.

19. A method for estimating focus error in an image received through an optical system, the method comprising:
computing filter responses for a set of image patches from a training set of images, for each of multiple defocus levels in a predetermined set of defocus levels for each image patch in the training set of images, for each of one or more defocus filters in a set of defocus filters for the optical system;
obtaining a distribution of filter response vectors from said computed filter responses for the set of image patches from the training set of images, for each defocus level of the multiple defocus levels; and
estimating a focus error for each defocus level based on the distribution of filter response vectors.

20. The method as in claim 19, wherein the set of defocus filters is determined from the training set of images for each defocus level using a point-spread function that represents the optical system, for each of the multiple defocus levels in the predetermined set of defocus levels for each image patch in the training set of images;
wherein each image patch in the training set of images is sampled using at least one wavelength sensitivity function, at least one a spatial sampling function, and at least one noise function for at least one class of sensor in a sensor array of the optical system, producing a representation of the image received through the optical system at the sensor array;
wherein the set of defocus filters is obtained from said sensor responses from said sensor array for each of said multiple defocus levels.

21. The method as in claim 19, wherein the set of defocus filters is obtained from said filter responses for each of said multiple defocus levels using a statistical technique comprising accuracy maximization analysis (AMA).

22. The method as in claim 19, wherein the set of defocus filters is obtained from said filter responses for each of said multiple defocus levels using a statistical technique comprising principle components analysis (PCA).

23. The method as in claim 19, the method further comprising:
characterizing each said filter response vector distribution by fitting a parametric function to the distribution, wherein the parametric function comprises a conditional likelihood distribution function.

24. The method as in claim 23, the method further comprising:
interpolating conditional likelihood distributions for defocus levels that have values between defocus levels in the said set of training defocus levels.

25. The method as in claim 19, further comprising:
estimating a focus error for an arbitrary image patch by
calculating a defocus filter response value for each of the one or more defocus filters in response to the arbitrary image patch, and
computing a probability of each defocus level using said set of conditional likelihood distributions and using the training filter response vector;
wherein the training filter response vector is generated in response to the arbitrary image patch, from the said set of defocus filters, and said combination of filter responses from said set of defocus filters.

26. The method as in claim 19, wherein said range of defocus level is within a range from approximately 0 diopters to approximately 2.25 diopters at an interval of approximately 0.25 diopters.

27. The method as in claim 19, wherein said range of defocus level is within a range from approximately −2.25 diopters to approximately 2.25 diopters at an interval of approximately 0.25 diopters.

28. The method as in claim 19, further comprising:
performing a Fourier transform of said sensor responses from said sensor array for said class of sensor.

29. The method as in claim 19, further comprising:
obtaining responses from said sensor array for more than one class of sensor in the sensor array.

30. The method as in claim 19, wherein the set of defocus filters is determined for more than one class of sensor in a sensor array of the optical system, such that the set of defocus filters provide information that defines magnitude and sign of defocus level.

31. A computer program product embodied in a computer readable storage medium for estimating focus error, the computer program product comprising programming instructions recorded on the medium such that, when executed by a computer processor, the programming instructions provide a method for:
computing filter responses for a set of image patches from a training set of images, for each of multiple defocus levels in a predetermined set of defocus levels for each image patch in the training set of images, for each of one or more defocus filters in a set of defocus filters for the optical system;
obtaining a distribution of filter response vectors from said computed filter responses for the set of image patches from the training set of images, for each defocus level of the multiple defocus levels; and
estimating a focus error for each defocus level based on the distribution of filter response vectors.

32. The computer program product as in claim 31, wherein the set of defocus filters is determined from the training set of images for each defocus level using a point-spread function that represents the optical system, for each of the multiple defocus levels in the predetermined set of defocus levels for each image patch in the training set of images;
wherein each image patch in the training set of images is sampled using at least one wavelength sensitivity function, a spatial sampling function, and at least one noise function for a class of sensor in a sensor array of the optical system, producing a representation of the image received through the optical system at the sensor array;
wherein the set of defocus filters is obtained from said sensor responses from said sensor array for each of said multiple defocus levels.

33. The computer program product as in claim 31, wherein the set of defocus filters is obtained from said filter responses for each of said multiple defocus levels using a statistical technique comprising accuracy maximization analysis (AMA).

34. The computer program product as in claim 31, wherein the set of defocus filters is obtained from said filter responses for each of said multiple defocus levels using a statistical technique comprising principle components analysis (PCA).

35. The computer program product as in claim 31, wherein the processor further performs:
characterizing each said filter response vector distribution by fitting a parametric function to the distribution, wherein the parametric function comprises a conditional likelihood distribution function.

36. The computer program product as in claim 35, the executed method further comprising:
interpolating conditional likelihood distributions for defocus levels that have values between defocus levels in the said set of training defocus levels.

37. The computer program product as in claim 31, wherein the processor further performs:
estimating a focus error for an arbitrary image patch by
calculating a defocus filter response value for each of the one or more defocus filters in response to the arbitrary image patch, and
computing a probability of each defocus level using said set of conditional likelihood distributions and using the training filter response vector;
wherein the training filter response vector is generated in response to the arbitrary image patch, from the said set of defocus filters, and said combination of filter responses from said set of defocus filters.

38. The computer program product as in claim 31, wherein said range of defocus level is within a range from approximately 0 diopters to approximately 2.25 diopters at an interval of approximately 0.25 diopters.

39. The computer program product as in claim 31, wherein said range of defocus level is within a range from approximately −2.25 diopters to approximately 2.25 diopters at an interval of approximately 0.25 diopters.

40. The computer program product as in claim 31, further comprising:
performing a Fourier transform of said sensor responses from said sensor array for said class of sensor.

41. The computer program product as in claim 31, further comprising:
obtaining responses from said sensor array for more than one class of sensor in the sensor array.

42. The computer program product as in claim 31, wherein the set of defocus filters is determined for more than one class of sensor in a sensor array of the optical system, such that the set of defocus filters provide information that defines magnitude and sign of defocus level.

43. A system comprising:
a memory unit for storing a computer program for estimating focus error in an image; and
a processor coupled to said memory unit, wherein said processor comprises circuitry for, responsive to executing said computer program:
computing filter responses for a set of image patches from a training set of images, for each of multiple defocus levels in a predetermined set of defocus levels for each image patch in the training set of images, for each of one or more defocus filters in a set of defocus filters for the optical system;
obtaining a distribution of filter response vectors from said computed filter responses for the set of image patches from the training set of images, for each defocus level of the multiple defocus levels; and
estimating a focus error for each defocus level based on the distribution of filter response vectors.

44. The system as in claim 43, wherein the set of defocus filters is determined from the training set of images for each defocus level using a point-spread function that represents the optical system, for each of the multiple defocus levels in the predetermined set of defocus levels for each image patch in the training set of images;
wherein each image patch in the training set of images is sampled using at least one wavelength sensitivity function, a spatial sampling function, and at least one noise function for a class of sensor in a sensor array of the optical system, producing a representation of the image received through the optical system at the sensor array;
wherein the set of defocus filters is obtained from said sensor responses from said sensor array for each of said multiple defocus levels.

45. The system as in claim 43, wherein the set of defocus filters is obtained from said filter responses for each of said multiple defocus levels using a statistical technique comprising accuracy maximization analysis (AMA).

46. The system as in claim 43, wherein the set of defocus filters is obtained from said filter responses for each of said multiple defocus levels using a statistical technique comprising principle components analysis (PCA).

47. The system as in claim 43, wherein the processor further performs:

characterizing each said filter response vector distribution by fitting a parametric function, wherein the parametric function comprises a conditional likelihood distribution function.

48. The system as in claim 47, the method further comprising:
interpolating conditional likelihood distributions for defocus levels that have values between defocus levels in the said set of training defocus levels.

49. The system as in claim 43, wherein the processor further performs:
estimating a focus error for an arbitrary image patch by
calculating a defocus filter response value for each of the one or more defocus filters in response to the arbitrary image patch, and
computing a probability of each defocus level using said set of conditional likelihood distributions and using the training filter response vector;
wherein the training filter response vector is generated in response to the arbitrary image patch, from the said set of defocus filters, and said combination of filter responses from said set of defocus filters.

50. The system as in claim 43, wherein said range of defocus level is within a range from approximately 0 diopters to approximately 2.25 diopters at an interval of approximately 0.25 diopters.

51. The system as in claim 43, wherein said range of defocus level is within a range from approximately −2.25 diopters to approximately 2.25 diopters at an interval of approximately 0.25 diopters.

52. The system as in claim 43, further comprising:
performing a Fourier transform of said sensor responses from said sensor array for said class of sensor.

53. The system as in claim 43, further comprising:
obtaining responses from said sensor array for more than one class of sensor in the sensor array.

54. The system as in claim 43, wherein the set of defocus filters is determined for more than one class of sensor in a sensor array of the optical system, such that the set of defocus filters provide information that defines magnitude and sign of defocus level.

55. A method of determining focus error in an image received at a sensor array of an optical system, the method comprising:
computing filter responses for a set of training image patches, received on a sensor array, that were defocused in simulation using a point-spread function that represents the optical system, for each of multiple defocus levels within a range of defocus for each image patch in the set of training image patches, for a plurality of filters, said filter responses comprising a filter response vector for each of said plurality of filters;
sampling each of said set of training image patches on said sensor array using a wavelength sensitivity function and a spatial sampling function that represent the sensor array;
obtaining sensor responses from said sensor array for a class of sensor in the sensor array;
generating a set of defocus filters from said sensor responses from said sensor array for each of said multiple defocus levels;
determining a probability likelihood of each filter response vector by obtaining a distribution of the filter response vectors for each of the training image patches in the set of training image patches;
characterizing the filter response vector distributions corresponding to each defocus level in the training image patches set with a parametric multi-dimensional function;
interpolating conditional likelihood distributions for defocus levels in between the defocus levels in the training image patches set; and
deriving an estimate of focus error for an arbitrary image patch with an unknown focus error by:
computing the filter response vector in response to the arbitrary patch,
computing the probability of each defocus level within the specified range of defocusing, and deriving an estimate of focus error from the computed probability.

* * * * *

UNITED STATES PATENT AND TRADEMARK OFFICE
CERTIFICATE OF CORRECTION

Page 1 of 1

PATENT NO. : 8,917,346 B2
APPLICATION NO. : 13/965758
DATED : December 23, 2014
INVENTOR(S) : Wilson Geisler and Johannes Burge It is certified that error appears in the above-identified patent and that said Letters Patent is hereby corrected as shown below:

In the Specification

In column 1 at line 19, please delete the following:

"The U.S. Government may own certain rights in this invention pursuant to the terms of the National Institutes of Health Grant No. 2 R01EY11747."

And replace with the following:

-- This invention was made with government support under Grant No. 2 R01EY11747 awarded by the National Institutes of Health. The government has certain rights in the invention. --

Signed and Sealed this
Twenty-eighth Day of July, 2015

Michelle K. Lee
*Director of the United States Patent and Trademark Office*